US012251732B1

(12) United States Patent
Adams

(10) Patent No.: US 12,251,732 B1
(45) Date of Patent: Mar. 18, 2025

(54) GOLD PANNING APPARATUS

(71) Applicant: James Adams, Coalmont (CA)

(72) Inventor: James Adams, Coalmont (CA)

( * ) Notice: Subject to any disclaimer, the term of this patent is extended or adjusted under 35 U.S.C. 154(b) by 0 days.

(21) Appl. No.: 18/619,494

(22) Filed: May 9, 2024

(51) Int. Cl.
*B07B 1/02* (2006.01)
*B07B 1/46* (2006.01)

(52) U.S. Cl.
CPC ................ *B07B 1/02* (2013.01); *B07B 1/469* (2013.01)

(58) Field of Classification Search
CPC .................................. B07B 1/02; A01K 31/04
USPC ......................................... 209/417, 418, 419
See application file for complete search history.

(56) References Cited

U.S. PATENT DOCUMENTS

| | | | | |
|---|---|---|---|---|
| 985,568 A * | 2/1911 | Conover | A01D 11/04 | 209/419 |
| 2,960,230 A | 11/1960 | Fracker | | |
| 4,289,241 A | 9/1981 | Litrap | | |
| 4,979,623 A * | 12/1990 | Flanagan | B07B 1/02 | 294/51 |
| 4,983,281 A | 1/1991 | Montelione | | |
| 5,306,061 A * | 4/1994 | Ives | A01B 1/02 | 209/419 |
| 5,921,596 A * | 7/1999 | Sheriff | A01K 1/0114 | 209/418 |
| 6,209,729 B1 * | 4/2001 | Brouillard | E04H 4/1609 | 209/418 |
| 6,312,029 B1 * | 11/2001 | Renforth | A01K 1/0114 | 294/1.3 |
| 6,334,538 B1 * | 1/2002 | Nettles | B07B 1/40 | 209/418 |
| 7,044,520 B2 * | 5/2006 | Roberson, Jr. | A01B 1/02 | 294/55.5 |
| 7,523,973 B2 * | 4/2009 | Lin | A01K 1/0114 | 294/1.3 |
| 8,016,118 B2 | 9/2011 | Boll | | |
| 9,114,429 B2 | 8/2015 | Wiherle | | |
| 9,179,642 B2 * | 11/2015 | Knittel | A01K 1/0114 | |
| D921,455 S | 6/2021 | Salazar | | |
| 11,236,481 B1 | 2/2022 | Franciskovich | | |
| 2005/0155914 A1 * | 7/2005 | Bettencourt | B07B 1/02 | 209/418 |
| 2005/0218044 A1 * | 10/2005 | Bramante | A01D 44/00 | 209/417 |
| 2007/0267333 A1 * | 11/2007 | Delman | B07B 1/02 | 209/418 |
| 2013/0140220 A1 * | 6/2013 | Knittel | A01K 1/01 | 209/419 |
| 2019/0159423 A1 * | 5/2019 | Davids | A01K 1/0114 | |

FOREIGN PATENT DOCUMENTS

| | | |
|---|---|---|
| WO | WO2022174126 | 8/2022 |

* cited by examiner

*Primary Examiner* — Terrell H Matthews

(57) ABSTRACT

A gold panning apparatus for stratifying pay gravel to obtain sediment containing gold includes a scoop which defines grooves on an inner surface of the scoop, a support member mounted atop the scoop, and a handle pivotally coupled to the support member. The handle is positionable in a storage position in which the handle nests closely with the support member and in a use position in which the handle extends away from the support member.

10 Claims, 5 Drawing Sheets

GOLD PANNING APPARATUS

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to gold panning apparatuses and more particularly pertains to a new gold panning apparatus for stratifying pay gravel to obtain sediment containing gold or other dense substances.

(2) Description of Related Art Including Information Disclosed Under 37 CFR 1.97 and 1.98

The prior art describes myriad devices for sifting pay gravel to separate gold pieces from the pay gravel and various panning apparatuses to stratify pay gravel. But the prior art fails to disclose such a device with a handle that folds compactly for storage but extends upwardly to facilitate use of the apparatus while standing. Compared to other devices without such a handle, larger containers become unwieldly for users to hold and agitate to stratify contained substances. A handle as described is advantageous in that users may agitate the container while it sits on the ground without bending over.

BRIEF SUMMARY OF THE INVENTION

An embodiment of the disclosure meets the needs presented above by generally comprising a scoop with a bottom wall and a perimeter wall. The perimeter wall is coupled to and extends away from the bottom wall to a top edge of the perimeter wall which defines a rim of the scoop. The scoop also defines a plurality of grooves in an inner surface of the scoop. A support member is coupled to the rim of the scoop and has a front section and a back section which are coupled together. The front section is coextensive with a portion of the rim of the scoop, and the back section extends upwardly and backwardly from the front section with respect to the scoop. A handle is pivotally coupled to the support member at a rear end of the support member. The handle is positionable in a storage position with respect to the support member in which the handle lies atop the support member and in a use position in which the handle extends backwardly away from the support member with respect to the scoop.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
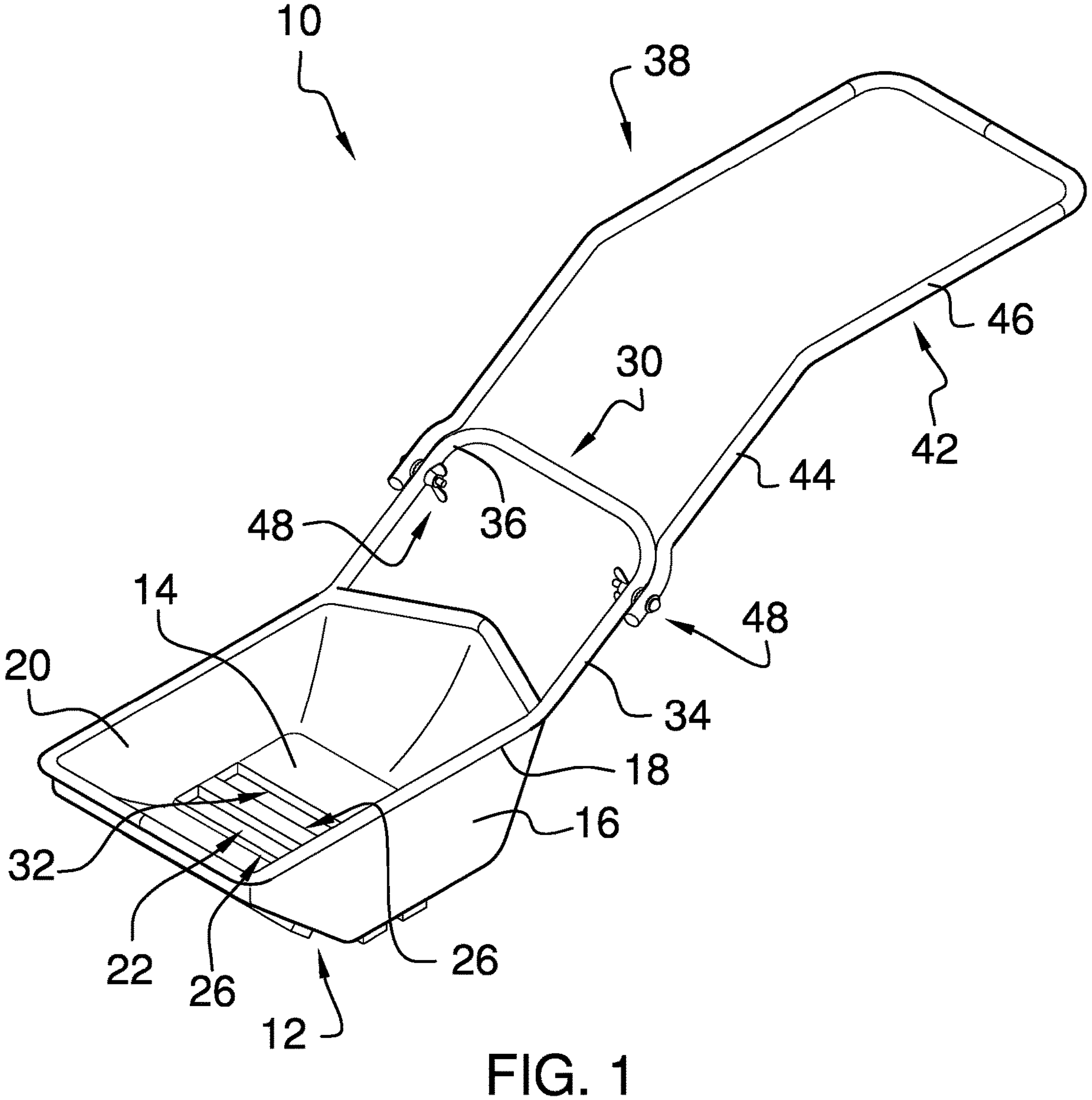
FIG. 1 is a perspective view of a gold panning apparatus according to an embodiment of the disclosure.
Figure 2:
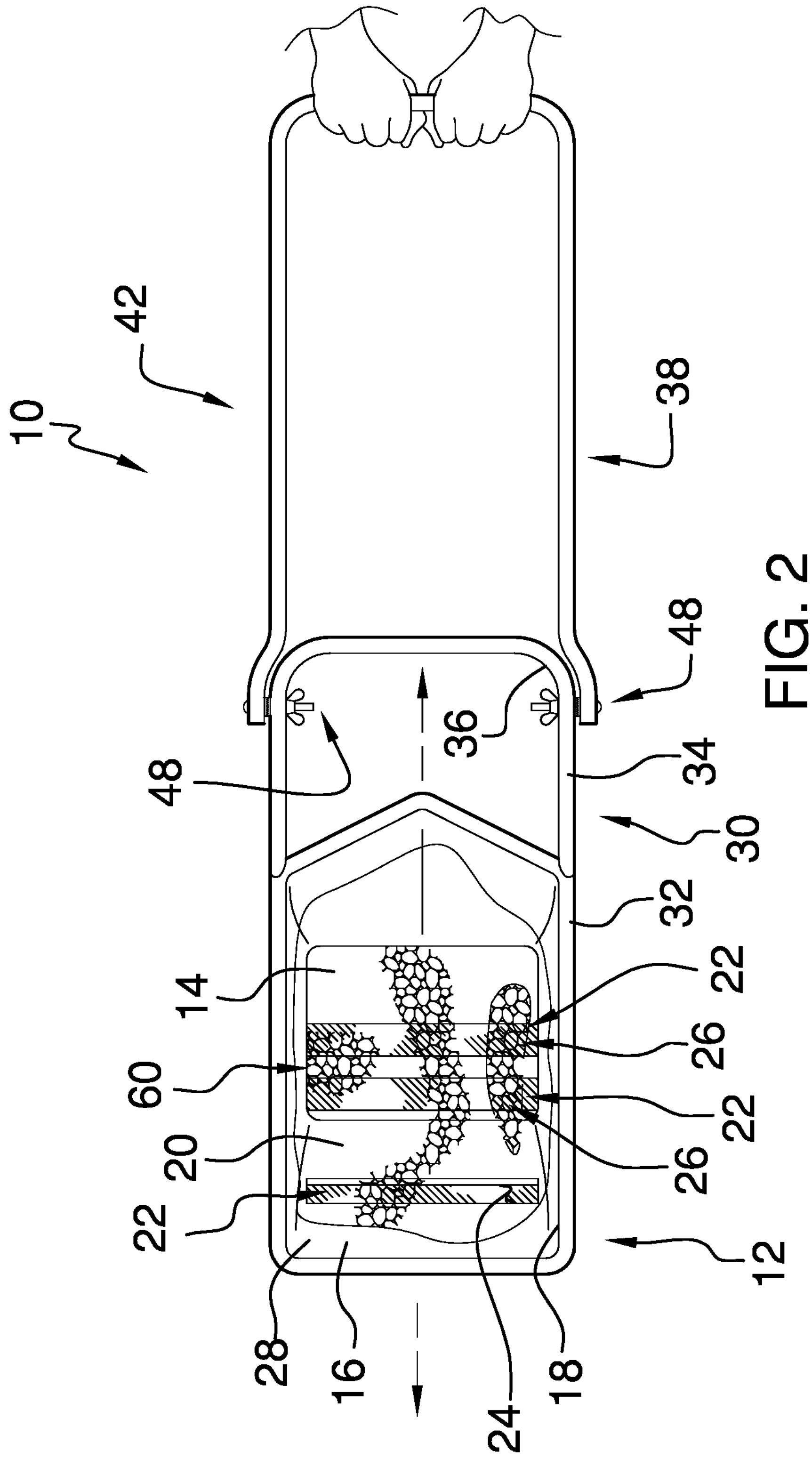
FIG. 2 is a top in-use view of an embodiment of the disclosure. The user shakes a mixture of pay gravel and water back and forth in a scoop via a handle.
Figure 3:
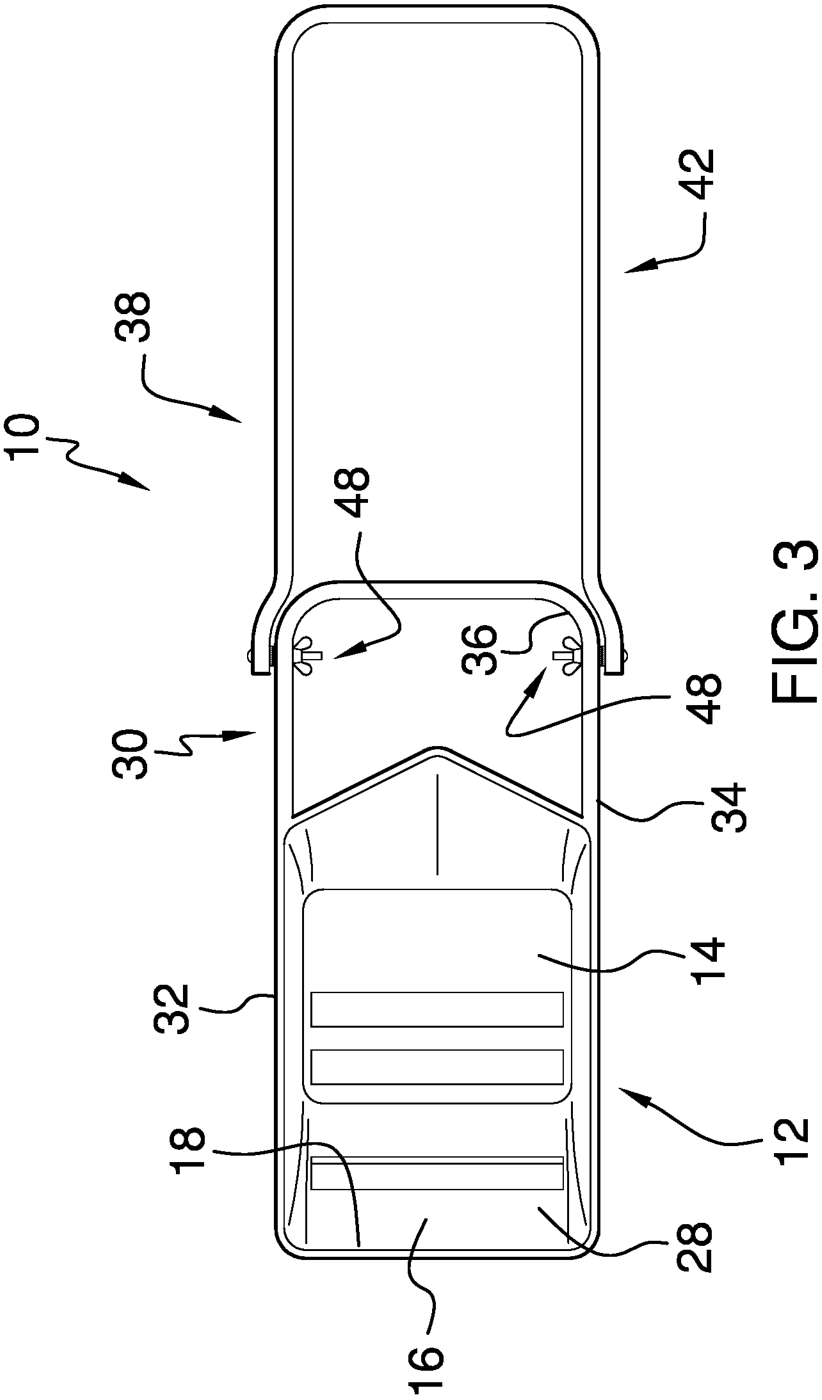
FIG. 3 is a bottom view of an embodiment of the disclosure.
Figure 4:
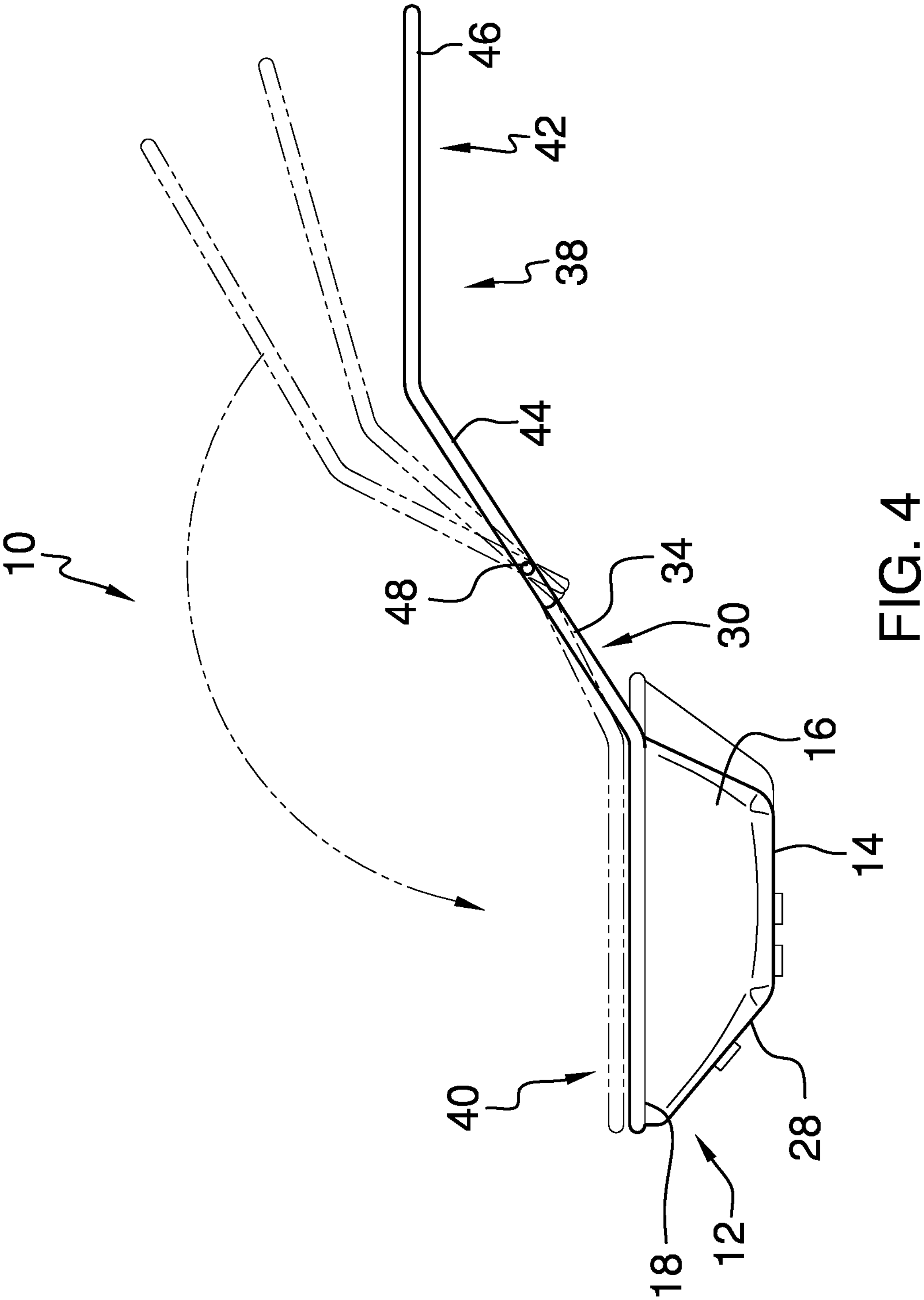
FIG. 4 is a side view of an embodiment of the disclosure.
Figure 5:
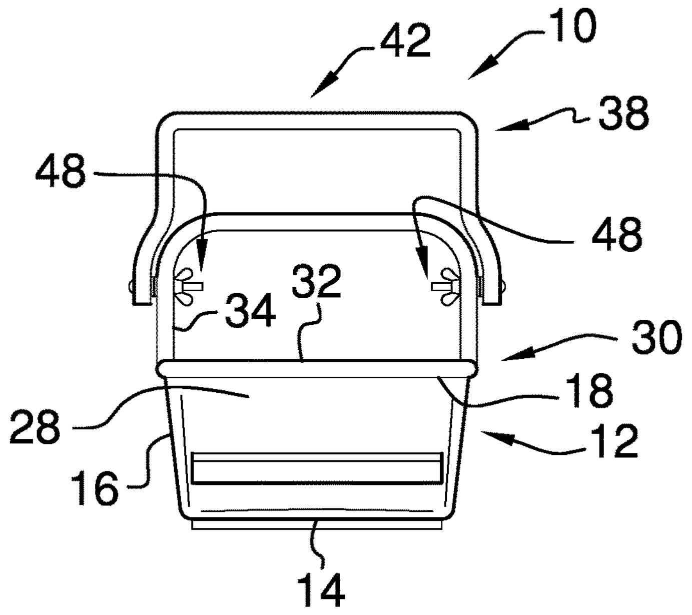
FIG. 5 is a front view of an embodiment of the disclosure.
Figure 6:
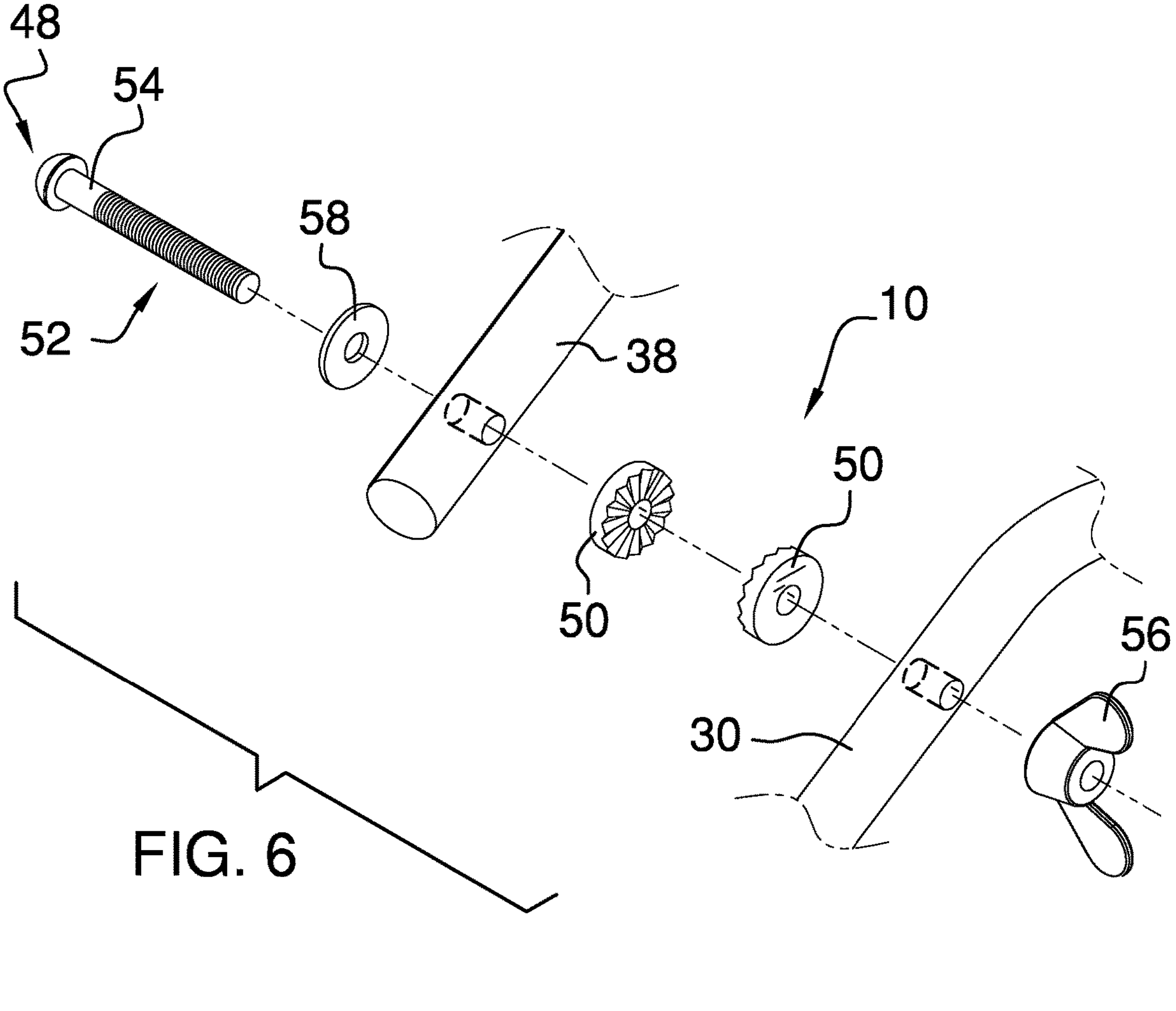
FIG. 6 is a detail exploded view of a locking hinge assembly of an embodiment of the disclosure.

With reference now to the drawings, and in particular to FIGS. 1 through 6 thereof, a new gold panning apparatus embodying the principles and concepts of an embodiment of the disclosure and generally designated by the reference numeral 10 will be described.

As best illustrated in FIGS. 1 through 6, the gold panning apparatus 10 generally comprises a scoop 12 with a bottom wall 14 and a perimeter wall 16. The perimeter wall 16 is coupled to and extends away from the bottom wall 14 to a top edge 18 which defines a rim of the scoop 12. The scoop 12 defines a plurality of grooves 22 or recesses in an inner surface 20 of the scoop 12, each of which extends laterally with respect to the scoop 12. The plurality of grooves 22 includes a perimeter groove 24 positioned on a front portion 28 of the perimeter wall 16 and a pair of bottom grooves 26 positioned on the bottom wall 14. The front portion 28 of the scoop 12 forms a scoop angle with the bottom wall 14 which is obtuse to facilitate dumping material forwardly of the scoop 12. The scoop angle may be, for example, 140.0 degrees and is at least 120.0 degrees.

A support member 30 is coupled to the rim of the scoop 12. The support member 30 has a front section 32 and a back section 34 which are coupled together. The front section 32 is coextensive with a portion of the rim of the scoop 12, and the back section 34 extends upwardly and backwardly from the front section 32 with respect to the scoop 12. The entirety of the support member 30 may be coextensive with the rim of the scoop 12 in some embodiments. The front section 32 forms a support angle with the back section 34 which is obtuse.

A handle 38 is pivotally coupled to the support member 30 at a rear end 36 of the support member 30. The handle 38 is positionable in a storage position 40 with respect to the support member 30 in which the handle 38 lies atop the support member 30. The handle 38 is shaped to lie coextensively with the support member 30 in a nested fashion when in the storage position 40. The handle 38 is also positionable in a use position 42 in which the handle 38 extends backwardly away from the support member 30 with respect to the scoop 12. The handle 38 has a support extension section 44 coupled to the support member 30 and a grip section 46 coupled to the support extension section 44. The grip section 46 forms a handle angle with the support extension section 44 equivalent to the support angle such that the handle 38 may nest with the support member 30 as described.

A pair of locking hinge assemblies 48 pivotally couples the handle 38 to the support member 30. The locking hinge assemblies 48 are operable to secure the handle 38 with respect to the support member 30 in a variety of positions. Each locking hinge assembly 48 comprises a pair of serrated locking plates 50 and a nut-and-bolt assembly 52. Each serrated locking plate 50 is coupled to one of the support member 30 and the handle 38 such as by a weldment or a suitable fastener. The serrated locking plates 50 have serrated surfaces which interlock with each other to rotationally lock the handle 38 with respect to the support member 30. The nut-and-bolt assembly 52 is mounted to clamp the serrated locking plates 50 together. A bolt 54 of the nut-and-bolt assembly 52 extends through the handle 38, the pair of serrated locking plates 50, and the support member 30, and a nut 56 of the nut-and-bolt assembly 52 is screwed onto the bolt 54. The nut 56 may be a wingnut to facilitate rotation of the nut 56 by hand, but other types of nuts are also contemplated. One or more washers 58 may also be included in each locking hinge assembly 48 to distribute forces and ease rotation of the handle 38 with respect to the support member 30. In other embodiments, other suitable clamps, securement devices, or positional locks may be used. For example, locking pins, latches, detents, and the like may be used to secure the handle 38 in a desired position with respect to the support member 30.

In use, the handle 38 is positioned in the use position 42. Pay gravel 60 and water are poured or dumped into the scoop 12, and a user shakes the scoop 12 forwardly and backwardly via the handle 38 to stratify the various substances in the pay gravel 60 by density. Denser substances, such as gold or other valuable substances, sink to the bottom of the scoop 12 and become captured in one of the grooves 22. The scoop 12 may be tilted forward during this process, which may lead to gold settling in the perimeter groove 24. The scoop 12 may then be tilted further forward to dump the less dense soils which have accumulated atop the denser substances in the grooves 22. While dumping, the scoop 12 will not be tipped so far as to dump the dense materials collected in the grooves 22. These materials captured in the grooves 22 may then be collected and subjected to screening or similar processes to recover gold or other desirable substances from the materials.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A gold panning apparatus comprising:

a scoop having a bottom wall and a perimeter wall, the perimeter wall being coupled to and extending away from the bottom wall, a top edge of the perimeter wall defining a rim of the scoop, the scoop defining a plurality of grooves in an inner surface of the scoop;

a support member coupled to the rim of the scoop, the support member having a front section and a back section which are coupled together, the front section being coextensive with a portion of the rim of the scoop, the back section extending upwardly and backwardly from the front section with respect to the scoop;

a handle pivotally coupled to the support member at a rear end of the support member, the handle being positionable in a storage position with respect to the support member in which the handle lies atop the support member, the handle being positionable in a use position in which the handle extends backwardly away from the support member with respect to the scoop;

wherein the handle is shaped to lie coextensively with the support member when in the storage position;

wherein the front section of the support member forms a support angle with the back section which is obtuse; and wherein the handle has a support extension section coupled to the support member and a grip section coupled to the support extension section, the grip section forming a handle angle with the support extension section equivalent to the support angle.

2. The apparatus of claim 1, wherein each groove of the plurality of grooves extends laterally with respect to the scoop.

3. The apparatus of claim 1, wherein the plurality of grooves includes a perimeter groove positioned on a front portion of the perimeter wall.

4. The apparatus of claim 1, wherein the plurality of grooves includes a bottom groove positioned on the bottom wall.

5. The apparatus of claim 1, wherein a front portion of the scoop forms a scoop angle with the bottom wall which is obtuse to facilitate dumping material forwardly of the scoop.

6. The apparatus of claim 5, wherein the scoop angle is at least 120.0 degrees.

7. The apparatus of claim 1, further comprising a locking hinge assembly pivotally coupling the handle to the support member, the locking hinge assembly being operable to secure the handle with respect to the support member in a variety of positions.

8. A gold panning apparatus comprising:

a scoop having a bottom wall and a perimeter wall the perimeter wall being coupled to and extending away from the bottom wall, a top edge of the perimeter wall defining a rim of the scoop, the scoop defining a plurality of grooves in an inner surface of the scoop;

a support member coupled to the rim of the scoop, the support member having a front section and a back section which are coupled together, the front section being coextensive with a portion of the rim of the scoop, the back section extending upwardly and backwardly from the front section with respect to the scoop;

a handle pivotally coupled to the support member at a rear end of the support member, the handle being positionable in a storage position with respect to the support member in which the handle lies atop the support member, the handle being positionable in a use position in which the handle extends backwardly away from the support member with respect to the scoop; and a locking hinge assembly pivotally coupling the handle to the support member, the locking hinge assembly being operable to secure the handle with respect to the support member in a variety of positions, wherein the locking hinge assembly comprises a pair of serrated locking plates, each serrated locking plate being coupled to one of the support member and the handle, the serrated locking plates having serrated surfaces which interlock with each other to rotationally lock the handle with respect to the support member, the serrated locking plates being biased to engage each other.

9. The apparatus of claim 8, wherein the locking hinge assembly further comprises a nut-and-bolt assembly mounted to clamp the serrated locking plates together, a bolt of the nut-and-bolt assembly extending through the handle, the pair of serrated locking plates, and the support member, a nut of the nut-and-bolt assembly being screwed onto the bolt.

10. A gold panning apparatus comprising:

a scoop having a bottom wall and a perimeter wall, the perimeter wall being coupled to and extending away from the bottom wall, a top edge of the perimeter wall defining a rim of the scoop, the scoop defining a plurality of grooves in an inner surface of the scoop, each groove of the plurality of grooves extending laterally with respect to the scoop, the plurality of grooves including a perimeter groove positioned on a front portion of the perimeter wall, the plurality of grooves including a pair of bottom grooves positioned on the bottom wall, the front portion of the scoop forming a scoop angle with the bottom wall which is obtuse to facilitate dumping material forwardly of the scoop, the scoop angle being at least 120.0 degrees;

a support member coupled to the rim of the scoop, the support member having a front section and a back section which are coupled together, the front section being coextensive with a portion of the rim of the scoop, the back section extending upwardly and backwardly from the front section with respect to the scoop, the front section forming a support angle with the back section which is obtuse;

a handle pivotally coupled to the support member at a rear end of the support member, the handle being positionable in a storage position with respect to the support member in which the handle lies atop the support member, the handle being shaped to lie coextensively with the support member when in the storage position, the handle being positionable in a use position in which the handle extends backwardly away from the support member with respect to the scoop, the handle having a support extension section coupled to the support member and a grip section coupled to the support extension section, the grip section forming a handle angle with the support extension section equivalent to the support angle;

a pair of locking hinge assemblies pivotally coupling the handle to the support member, the locking hinge assemblies being operable to secure the handle with respect to the support member in a variety of positions, each locking hinge assembly comprising:

a pair of serrated locking plates, each serrated locking plate being coupled to one of the support member and the handle, the serrated locking plates having serrated surfaces which interlock with each other to rotationally lock the handle with respect to the support member; and a nut-and-bolt assembly mounted to clamp the serrated locking plates together, a bolt of the nut-and-bolt assembly extending through the handle, the pair of serrated locking plates, and the support member, a nut of the nut-and-bolt assembly being screwed onto the bolt.

* * * * *